United States Patent
Lo Presti et al.

(10) Patent No.: US 7,102,501 B2
(45) Date of Patent: Sep. 5, 2006

(54) DEVICE AND METHOD FOR AUTOMATICALLY PREVENTING MISTING OF THE WINDSCREEN OF A VEHICLE

(75) Inventors: Giulio Lo Presti, Viareggio (IT); Stefano Mola, Piossasco (IT); Carloandrea Malvicino, Turin (IT); Gennaro Bisceglia, Lavello (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 263 days.

(21) Appl. No.: 10/447,188

(22) Filed: May 28, 2003

(65) Prior Publication Data

US 2004/0040321 A1 Mar. 4, 2004

(30) Foreign Application Priority Data

May 29, 2002 (IT) ............................ TO2002A0457

(51) Int. Cl.
*G08B 23/00* (2006.01)
*F25D 21/06* (2006.01)

(52) U.S. Cl. ...................... 340/501; 340/588; 340/589; 340/602; 340/425.5; 62/80; 62/176.2; 62/176.6; 236/44 C; 165/204; 165/230

(58) Field of Classification Search ................ 340/501, 340/425.5, 588, 589, 602, 601; 236/44 R, 236/44 C, 91 C, 49.3; 62/80, 89, 176.1, 62/176.2, 176.6, 178; 165/204, 230
See application file for complete search history.

(56) References Cited

U.S. PATENT DOCUMENTS

| | | | | |
|---|---|---|---|---|
| 4,424,933 A * | 1/1984 | Sutoh et al. | ............... | 236/44 A |
| 4,896,589 A * | 1/1990 | Takahashi | ................... | 454/75 |
| 4,920,755 A * | 5/1990 | Tadahiro | ...................... | 62/171 |
| 5,931,006 A * | 8/1999 | Straub et al. | .................. | 62/89 |
| 6,668,917 B1 * | 12/2003 | Zeng | .......................... | 165/202 |
| 2001/0032470 A1 | 10/2001 | Remond et al. | .............. | 62/133 |

FOREIGN PATENT DOCUMENTS

| | | |
|---|---|---|
| DE | 195 17 336 A1 | 11/1995 |
| DE | 199 42 286 C1 | 8/2000 |
| EP | 0 950 587 A1 | 10/1999 |
| EP | 1 112 871 A1 | 7/2001 |

* cited by examiner

*Primary Examiner*—Donnie L. Crosland
(74) *Attorney, Agent, or Firm*—Chapman and Cutler LLP

(57) ABSTRACT

A device and method for automatically preventing misting of the windscreen of a vehicle, wherein a number of sensors determine ambient conditions capable of misting the windscreen, and, upon such ambient conditions occurring, an electronic central control unit automatically activates the air-conditioning system of the vehicle to prevent the windscreen from misting. The device has and the method utilizes a radiant mean temperature sensor arranged inside the vehicle passenger compartment to measure temperature inside the passenger compartment. The radiant mean temperature sensor (4) has a field of view including at least part of the windscreen.

18 Claims, 1 Drawing Sheet

DEVICE AND METHOD FOR AUTOMATICALLY PREVENTING MISTING OF THE WINDSCREEN OF A VEHICLE

The present invention relates to a device and method for automatically preventing misting of the windscreen of a vehicle.

BACKGROUND OF THE INVENTION

As is known, of the numerous steps taken to improve driving safety, many are aimed at distracting the driver's attention from the road as little as possible, particularly as regards manual interaction with on-vehicle systems.

Nevertheless, numerous sources of distraction still remain, foremost of which is undoubtedly demisting the windscreen.

Demisting a vehicle windscreen, in fact, not only calls for turning on the air-conditioning system fan by hand, and possibly also orienting the air inlet ports manually to direct airflow onto the windscreen, but is also normally performed when the windscreen is already misted, so that it takes a fairly long time for full visibility through the windscreen to be restored.

SUMMARY OF THE INVENTION

It is an object of the present invention to provide a device and method for automatically preventing misting of a vehicle windscreen.

According to the present invention, there are provided a device and method for automatically preventing misting of a vehicle windscreen, as claimed in claims 1 and 9 respectively.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
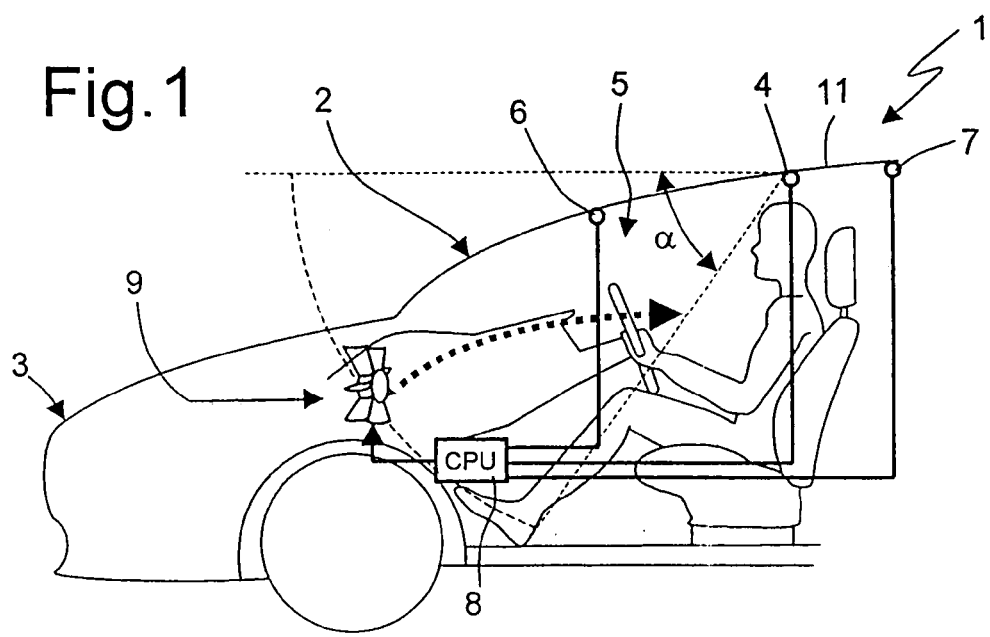
FIG. 1 shows, schematically, a device for automatically preventing misting of a vehicle windscreen in accordance with the present invention.

Number 1 in FIG. 1 indicates as a whole a device in accordance with the present invention for automatically preventing misting of the windscreen 2 of a vehicle 3—in the example shown, a motor vehicle.

Device 1 substantially comprises an internal-temperature sensor 4 supplying information relative to the temperature inside the passenger compartment 5 of vehicle 3; an external-temperature sensor 6 supplying information relative to the temperature outside vehicle 3; a relative humidity sensor 7 supplying information relative to the relative humidity inside passenger compartment 5 of vehicle 3; ad an electronic central control unit 8 connected to sensors 4, 6, 7.

More specifically, according to one aspect of the present invention, the internal-temperature sensor 4 used is conveniently a radiant mean temperature sensor, which is an optical sensor having a field of view whose angle depends on the optics with which it is equipped (e.g. $\alpha = 30$–$60°$), and comprising a thermocouple housed in a vacuum chamber and supplying information relative to the mean temperature radiating from the objects within its field of view. By adjusting the optics of the radiant mean temperature sensor, the field of view of the sensor can therefore be adapted to the conformation of passenger compartment 5 of vehicle 3 in which the sensor is housed.

The internal-temperature sensor is conveniently located inside passenger compartment 5 of vehicle 3, facing windscreen 2 of vehicle 3, and preferably on the inner face of roof 11 of vehicle 3, adjacent to the courtesy light (not shown).

Relative humidity sensor 7 is also located inside passenger compartment 5 of vehicle 3, facing windscreen 2 of vehicle 3, and also preferably on the inner face of roof 8 of vehicle 3, adjacent to the courtesy light.

As an external-temperature sensor 6, on the other hand, a temperature sensor already provided on vehicle 3 for other purposes is used, e.g. the air-conditioning system temperature sensor, which is normally located underneath the internal rearview mirror (not shown) of vehicle 3, or the engine control system temperature sensor, which is normally located on the air intake conduit (not shown).

Electronic central control unit 8 is connected to, and receives the electric signals generated by, internal-temperature sensor 4, external-temperature sensor 6, and relative humidity sensor 7, and controls the air-conditioning system 9 of vehicle 3—shown schematically in FIG. 1 by a fan—as a function of the electric signals to prevent misting of windscreen 2 of vehicle 3, as described below with reference to the operational flow chart in FIG. 2.

Figure 2:
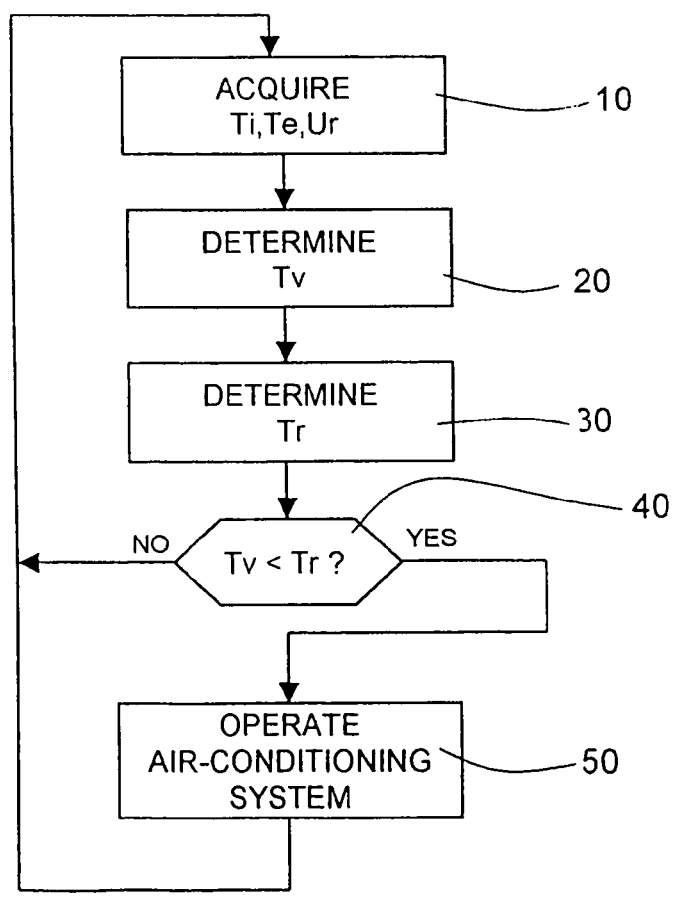
FIG. 2 shows an operational flow chart of the method for automatically preventing misting of a vehicle windscreen according to the present invention.

As shown in FIG. 2, electronic central control unit 8 first acquires the values of internal temperature Ti, external temperature Te, and relative humidity Ur supplied respectively by internal-temperature sensor 4, external-temperature sensor 6, and relative humidity sensor 7 (block 10).

Electronic central control unit 8 then determines (block 20) the temperature Tv of the inner face of windscreen 2 of vehicle 3 as a function of internal temperature Ti and external temperature Te, according to the following equation:

$$C_v \frac{dT_v}{d\tau} = \alpha_1 \cdot A_1 \cdot (T_1 - T_v) - \frac{a_e \cdot \lambda \cdot \lambda_{pvb}}{a_e \cdot [\lambda_{pvb} \cdot (s_1 + s_3) + \lambda \cdot s_2] + \lambda \cdot \lambda_{pvb}} \cdot A_1 \cdot (T_v - T_e)$$

where:
$C_v$=windscreen heat capacity [J/K]
$T_v$=windscreen temperature [° C.]
$A_1$=windscreen area [m²]
$T_i$=passenger compartment temperature [° C.]
$T_e$=external temperature [° C.]
$\alpha_i$=internal convective heat exchange coefficient [W/(m².K)]
$\alpha_e$=external convective heat exchange coefficient [W/(m².K)]
$s_1$=inner glass thickness [m]
$s_2$=pvb layer thickness [m]
$s_3$=outer glass thickness [m]
$\lambda$=glass thermal conductivity [W(m.K)]
$\lambda_{pvb}$=pvb thermal conductivity [W(m.K)]

Electronic central control unit 8 then determines the dew point temperature Tr inside passenger compartment 5 of vehicle 3—that is, the temperature of the inner face of windscreen 2, below which vapour inside passenger compartment 5 of vehicle 3 condenses on and mists windscreen 2—as a function of internal temperature Ti and relative humidity UR inside passenger compartment 5 (block 30).

More specifically, dew point temperature Tr is calculated as follows:

first of all, the actual partial vapour pressure pw [Pa] at temperature Ti [° C.] and relative humidity UR [%] is calculated according to the equation:

$$pw=6898.55*10^{\wedge}(k0+k1/(Ti*1.8+491.72)+k2/(Ti*1.8+491.72)^{\wedge}2)*UR/100$$

where k=0−6.21147, k=1−2886.373, k2=−337269.46;

documented tables showing water vapour saturation pressure values as a function of temperature are then consulted, and, by interpolating the table values, dew point temperature Tr [° C.] is the temperature corresponding to the actual partial vapour pressure pw defined above and representing saturation pressure.

At this point, electronic central control unit 8 compares the temperature Tv of the inner face of windscreen 2 with the dew point temperature Tr (block 40).

As long as the temperature Tv of the inner face of windscreen 2 is higher than dew point temperature Tr (NO output of block 40), the physical conditions required to produce condensation on, and so begin misting, the inner face of windscreen 2 do not exist, so operation of electronic central control unit 8 starts again from block 10.

Conversely, when the temperature Tv of the inner face of windscreen 2 is below dew point temperature Tr (YES output of block 40), the physical conditions required to produce condensation on, and so begin misting, the inner face of windscreen 2 exist, so electronic central control unit 8 accordingly operates the air-conditioning system 9 of vehicle 3 to prevent windscreen 2 from misting (block 50).

More specifically, intervention of electronic central control unit 8 to prevent windscreen 2 from misting substantially comprises activating the fan of air-conditioning system 9; heating the air intake from outside or inside vehicle 3 (normally using the heat radiated by the vehicle engine); and adjusting the air inlet ports to direct hot air onto the inner face of windscreen 2 to increase its temperature and so prevent it from misting.

Once this is done, operation of electronic central control unit 8 starts again from block 10.

The advantages of the device according to the present invention will be clear from the foregoing description.

In particular, the device according to the invention provides for predicting well in advance the physical conditions resulting in the formation of condensation on, and initial misting of, the inner face of the vehicle windscreen, and intervenes fully automatically to prevent the windscreen from misting. Tests conducted by the Applicant, in fact, show the algorithm described to be capable of predicting misting of the windscreen approximately three minutes in advance.

As such, the driver of the vehicle is not required to operate the air-conditioning system to demist the windscreen, and visibility through the windscreen is at no time impaired.

The device according to the invention also provides for predicting the physical conditions resulting in the formation of condensation on the inner face of the vehicle windscreen using a fairly small number of sensors—only two, in fact, seeing as how the external-temperature sensor used is one already installed on the vehicle for other purposes—thus enabling advantages in terms of cost, size, and location.

By actually preventing misting of the windscreen, the device according to the invention is also more convenient energywise, as compared with conventional demisting, on account of the hysteresis associated with the change in state of the vapour.

Clearly, changes may be made to the device as described and illustrated herein without, however, departing from the scope of the present invention as defined in the accompanying claims.

For example, internal and external temperature may be determined otherwise than as described, e.g. indirectly from other physical quantities measured on the vehicle.

The electronic central control unit may intervene differently to prevent misting of the windscreen, and the temperature of the inner face of the windscreen may be raised otherwise than as described.

The invention claimed is:

1. A device (1) for preventing misting of the windscreen (2) of a vehicle (3) having a passenger compartment (5), comprising:

sensor means (4, 6, 7) for detecting ambient conditions capable of misting said windscreen (2) and supplying information regarding said ambient conditions; and intervention means which receive said information from said sensor means (4, 6, 7) and are activated automatically, upon said ambient conditions occurring, to prevent misting of said windscreen (2), wherein said sensor means (4, 6, 7) comprise radiant mean temperature sensor means (4) arranged inside said passenger compartment (5) to measure temperature (Ti) inside the passenger compartment (5), said radiant mean temperature sensor means (4) having a field of view including at least part of said windscreen (2).

2. A device as claimed in claim 1, wherein said intervention means comprise ambient condition altering means (9), which are activated automatically, upon said ambient conditions occurring, to alter at least one of said ambient conditions, at least in the vicinity of said windscreen (2).

3. A device as claimed in claim 1, wherein said intervention means are activated when a predetermined relationship exists between the temperature of the windscreen (Tv) and a dew point temperature (Tr).

4. A device as claimed in claim 3, wherein said predetermined relationship is defined by the temperature of the windscreen (Tv) being below the dew point temperature (Tr).

5. A device as claimed in claim 1, wherein said sensor means (4, 6, 7) comprise:

external-temperature sensor means (6) indicating the temperature (Te) outside said vehicle (3); and humidity sensor means (7) indicating the humidity (UR) inside the passenger compartment (5) of said vehicle (3).

6. A device as claimed in claim 5, wherein said intervention means comprise calculating means (20, 30) for calculating the temperature of the windscreen (Tv) as a function of the temperature (Ti) inside the passenger compartment (5) of said vehicle (3), and of the temperature (Te) outside said vehicle (3), and for calculating the dew point temperature (Tr) as a function of the temperature (Ti) and humidity (UR) inside the passenger compartment (5) of said vehicle (3).

7. A device as claimed in claim 6, wherein said intervention means also comprise comparing means (40) for comparing the temperature of the windscreen (Tv) with the dew point temperature (Tr), and for activating said intervention means when the temperature of the windscreen (Tv) is below the dew point temperature (Tr).

8. A device as claimed in claim 6, wherein said intervention means also comprise air-conditioning means (9); and control means (50) for controlling said air-conditioning means (9) so as to direct a stream of hot air onto said windscreen (2).

9. A device according to claim 1, wherein said radiant temperature sensor means (4) are arranged on an inner face of a roof (11) of said vehicle (1).

10. A method of preventing misting of the windscreen of a vehicle having a passenger compartment (5), comprising the steps of:
    determining ambient conditions capable of misting said windscreen (2); and
    automatically activating intervention means for preventing misting of said windscreen (2) upon said ambient conditions occurring, wherein
    said step of determining ambient conditions capable of misting said windscreen (2) comprises determining temperature (Ti) inside said passenger compartment (5), and
    said step of determining temperature (Ti) comprises arranging, inside said passenger compartment (5), radiant mean temperature sensor means (4) for sensing temperature, having a field of view including at least part of said windscreen (2).

11. A method as claimed in claim 10, wherein said radiant temperature sensor means (4) are arranged on an inner face of a roof (11) of said vehicle (1).

12. A method as claimed in claim 10, wherein said step of automatically activating intervention means comprises the step of automatically activating ambient condition altering means to alter at least one of said ambient conditions, at least in the vicinity of said windscreen (2).

13. A method as claimed in claim 10, comprising the step of activating said intervention means when a predetermined relationship exists between the temperature of the windscreen (Tv) and a dew point temperature (Tr).

14. A method as claimed in claim 13, wherein said predetermined relationship is defined by the temperature of the windscreen (Tv) being below the dew point temperature (Tr).

15. A method as claimed in claim 10, wherein said step of determining ambient conditions capable of misting said windscreen (2) comprises the steps of:
    determining the temperature (Te) outside said vehicle (3); and
    determining the humidity (UR) inside the passenger compartment (5) of said vehicle (3).

16. A method as claimed in claim 15, wherein said step of automatically activating said intervention means comprises the steps of:
    calculating the temperature of the windscreen (Tv) as a function of the temperature (Ti) inside the passenger compartment (5) of said vehicle (3), and of the temperature outside said vehicle (3); and
    calculating the dew point temperature (Tr) as a function of the temperature (Ti) and humidity (UR) inside the passenger compartment (5) of said vehicle (3).

17. A method as claimed in claim 16, wherein said step of automatically activating said intervention means also comprises the steps of:
    comparing the temperature of the windscreen (Tv) with the dew point temperature (Tr); and
    automatically activating said intervention means when the temperature of the windscreen (Tv) is below the dew point temperature (Tr).

18. A method as claimed in claim 16, wherein said step of automatically activating said intervention means comprises the step of:
    controlling air-conditioning means (9) of said vehicle (3) so as to direct a stream of hot air onto said windscreen (2).

* * * * *